Dec. 8, 1964   E. B. HEDGEPETH   3,160,434
COLLAPSIBLE CABIN AND ACCOMMODATING SUPPORT
STRUCTURE FOR AUTOMOBILES
Filed April 19, 1962
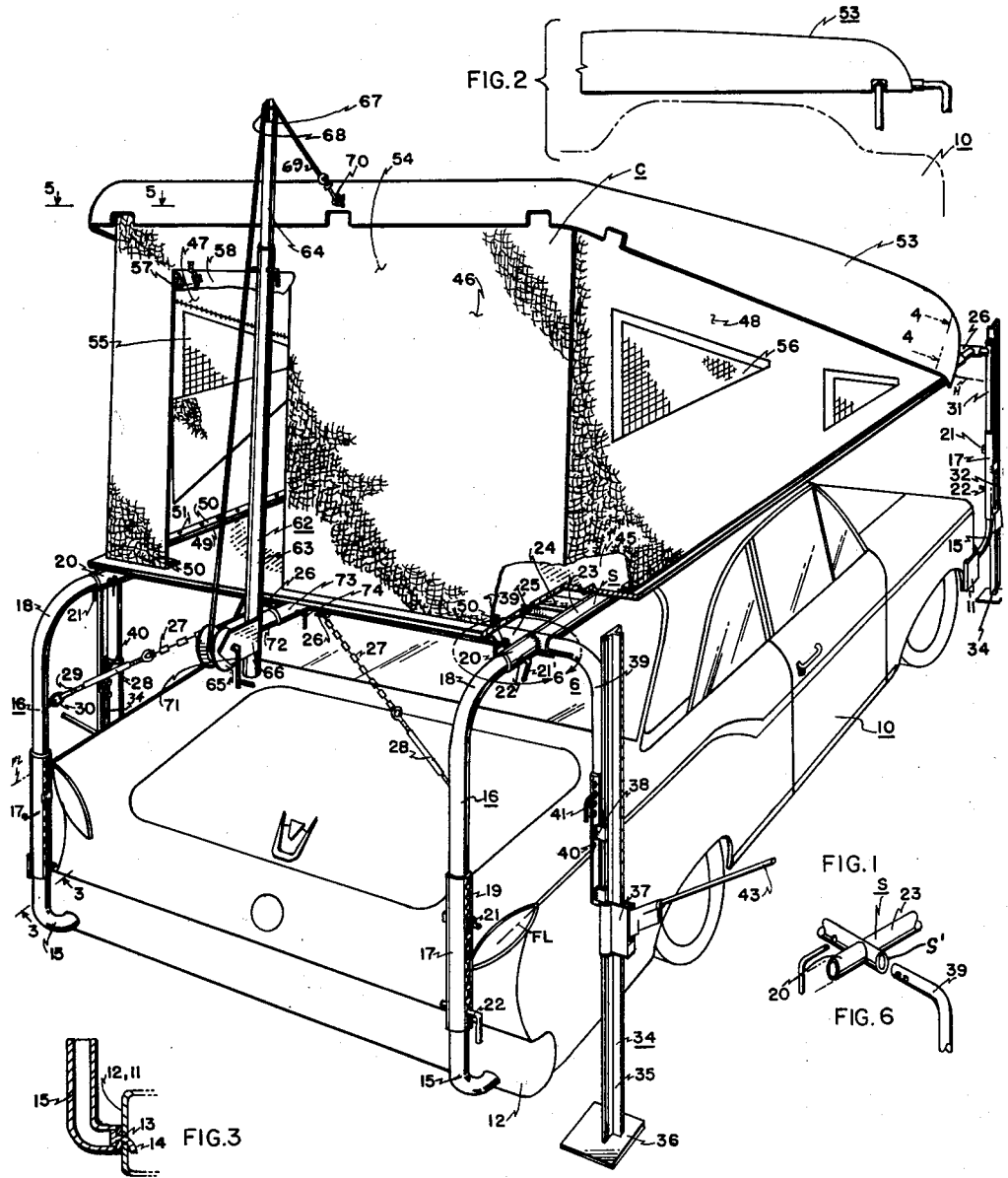
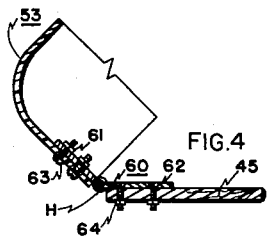
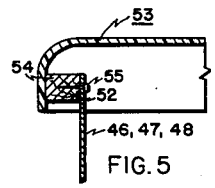
*INVENTOR.*
EDWARD B. HEDGEPETH
BY M. Ralph Shaffer
HIS ATTORNEY United States Patent Office 3,160,434
Patented Dec. 8, 1964

3,160,434
COLLAPSIBLE CABIN AND ACCOMMODATING
SUPPORT STRUCTURE FOR AUTOMOBILES
Edward B. Hedgepeth, 2819 St. Marys Way,
Salt Lake City, Utah
Filed Apr. 19, 1962, Ser. No. 188,742
6 Claims. (Cl. 296—23)

The present invention relates to collapsible cabins and support structures therefor which are adapted for vehicle mounting and, more particularly, to a new and improved cabin structure, support frame, and support means therefor which are very versatile in use, inexpensive to manufacture, and rugged both in transit and during occupancy.

Accordingly, a principal object of the present invention is to provide a new and improved support frame and collapsible cabin structure for automobile transport, and this in a new and novel manner by improved means.

A further object of the present invention is to provide a support frame, for disposition above a towing automobile, which is of a nature such that the upstanding supports therefor when connected to the automobile do not extend beyond the fender lines thereof, and yet which provides means for auxiliary jack support so that portions of the support frame support structure may be removed and the automobile driven from underneath the support frame for use as desired and without the encumbrance of the support frame structure when not required.

A further object of the invention is to provide an improved, collapsible cabin structure for disposition above the top of a towing automobile, which collapsible cabin structure includes novel hinge structure disposed at the forward extremity thereof and suitable, winch driven structure rearwardly thereof to hoist a cabin to an erected, open enclosure position.

A further object of the invention is to provide easy and convenient means for mounting, dismounting and jacking a support frame to automobiles, the support frame structure being adapted for carriage by the bumpers of the towing vehicle, thereby taking advantage of the innate spring action of the automobile.

A further object is to provide a collapsible cabin wherein the roof thereof is translucent and the sides provided with ventilation openings to aid in rendering comfort to the occupants of the collapsible cabin.

An additional object is to provide collapsible cabin and support structure for an automobile accessories for which are easily mountable to and detachable from the bumpers of an automobile and, indeed, from the support frame thereof, thereby rendering the support structure very versatile for a number of uses and for removement from a towing vehicle.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a perspective view, partially broken away for convenience of illustration, of an automobile having mounted thereon at the bumpers thereat certain support frame structure and a collapsible cabin therefor; it will be appreciated, however, that the support frame structure may be used for purposes other than carrying car top cabins.

FIGURE 2 is a fragmentary side elevation in reduced scale of the automobile and collapsible cabin structure of FIGURE 1 when the same is collapsed for automobile transport.

FIGURE 3 is an enlarged, sectional, fragmentary view taken along the line 3—3 in FIGURE 1 of the structure which mounts the support structure to the bumpers of the towing automobile.

FIGURE 4 is an enlarged section taken along the line 4—4 in FIGURE 1 of the hinge structure of the roof member and its relation to the support frame floor panel structure.

FIGURE 5 is a fragmentary sectional view taken along the line 5—5 in FIGURE 1, illustrating the manner in which the rear and side panels of the cabin enclosure may be affixed to the roof structure of the cabin.

FIGURE 6 is an exploded view of a representative structural area as taken along the line 6—6 in FIGURE 1.

In FIGURE 1 the automobile 10 includes conventional front and rear bumpers 11 and 12 each of which is provided with plural apertures 13 (one being shown, FIGURE 3) for receiving the depending fingers 14 of respective bumper mounting members 15. Rear upright means 16 may be substantially identical, and each includes, in addition to bumper mounting member 15, a respective medial sleeve 17 and an inverted-L, upstanding member 18. It will be noted that the combination of members 15, 17 and 18 of each of the upstanding means 16 present a general C-configurement. This is desired so as to relieve the automobile and particularly the upper portion of the bumper, and also to permit this upstanding support means disposed at both corners of the automobile and support frame (hereinafter described) to be positioned rearwardly of the carrying automobile and interiorly of the side extremities or fender lines FL of the automobile. Highway safety regulations generally require that all equipment carried by motor vehicles must be disposed between the fender lines of the vehicle so that there are no lateral protrusions from the vehicle tending to cause accidents on the highway.

Members 15 and 18 are each provided with a plurality of pin receiving apertures (not shown) adapted for registration with apertures 19 of intercoupling sleeve 17. Pins 21 and 22 of each of the upstanding support means 16 provide releasable engagement between the coupling sleeve 17 and the extremities of upstanding member 18 and bumper mounting member 15.

A pair of bumper mounting members 15 are also disposed at the front of the vehicle and engage the front bumper 11 as shown in FIGURE 3, that is, in a manner substantially identical to the attachment of the bumper mounting members 15 to rear bumper 12. Upstanding members 18 of each of the rear upstanding support means 16 are afforded a telescoping or fitting engagement with a respective cylindrical stub 20 of support frame S. The stub fitting 20 and member 18 on each side of the support frame may be cylindrical as shown, if desired, and either may fit over the other and a suitable pin means 21' be provided for pinning the two members at aligned apertures 22'.

Support frame S also includes horizontally disposed longitudinal beams 23 and a plurality of cross members 24 interconnecting and spanning said beams. For convenience of illustration only one cross member 24 is illustrated. The support frame S may also include front and rear cross members 25 and 26 which are welded or otherwise secured to the longitudinal beams 23 and the rearmost of which may include elongate connector hooks 26 for releasably receiving and retaining elongate connectors 27, the latter have turnbuckles 28 and spring-loaded, manually actuatable hooks 29. The hooks 29 of the elongate connectors 27 may be used to engage loops 30 which are welded or otherwise secured to upstanding members 18. Elongate connectors 27 with their associate equipment serve to lend rigidity to the structure when the same is mounted to the automobile and particularly when they are askew to the longitudinal axis of the support frame. Thus, the elongate connectors 27 hold side-sway to a minimum, whereas the inverted-L configurement of members 18 eliminate fore and aft sway due to accelerations and decelerations of the carrying vehicle.

Front cross member 26 terminates in or is welded to a pair of front upstanding support members 31 (only one being shown). A coupling sleeve 17 is pinned thereto by means of pin 21, and the coupling sleeve is likewise pinned by pin means 22 to the bumper mounting member 15 associated therewith. Means 32 are supplied for engaging a suitable jack means 34 four of which are employed at the four respective corners of the structure. The jack means 34 includes, of course, the conventional jack bar 35 with support plate 36, a jack mechanism 37 secured thereto in a conventional ratchet fitting connection, and guides 38 affixed to upstanding member or side upright 39 and slidingly receive the jack bar 35 so that jack mechanism 37 may urge upwardly against the lowermost guide 38 and thus lift and support the side upstanding member 39.

It will be observed that the jack mechanism 37 at the lower right wheel of the automobile engages the lowermost guide 38 welded to sleeve 40 the latter of which is pinned by pin 41 to upstanding member 39. This construction will be the same on both sides of the vehicle at the rear area thereof. In contrast with this, guides 42 at each front side of the vehicle are welded directly into coupling sleeve 17 at both corners at the front of the vehicle so that the jack means 34 may engage and support the same. A conventional jack handle 43 is also supplied to actuate the jack mechanism by manual operation.

Side upstanding members 39 are pinned in releasable securement by pins 39' to cross member 25.

Floor panel 45 is bolted or otherwise secured to the support frame S, and the lower margins of the rear and side wall collapsible panels 46, 47 and 48 are turned inwardly as at 49 and are secured in place by a plurality of mounting strips 50 which in turn are secured to the floor panel 45 by means of attachments 51. Upper margins 52 (see FIGURE 5) of each of the panels 46, 47 and 48 are secured to the roof member 53 by means of stringers 54 glued to roof member 53, and by attachments 55. See FIGURE 5 in this connection. The roof member 53 is preferably made of a translucent fiberglass material. While other types of materials may be used, it is preferred that the roof member be hollow and concave downwardly and be molded to the desired configuration for containing the side and rear wall panels 46, 47 and 48 of the cabin structure when collapsed, so that the over-all structure will be suited for transport directly on top of the towing automobile 10. It is highly desired that the material comprising the roof member 53 be translucent so that sufficient light will enter the cabin enclosure 54 to give light to occupants therein.

Returning to the cabin structure itself it will be seen that the side walls 47 and 48 each include screened, ventilation windows 55 and 56 for supplying a cross draft within the enclosure for the comfort of the occupants. Correspondingly, in the rear sidewall 46 of the structure there will be provided a closable doorway 57 which is closed by doorflap 58. Entrance to the cabin enclosure 54 may be made by the occupants either stepping on the rear bumper 12 and immediately entering the doorway 57, by a suitable ladder being positioned from the ground to the floor panel 45, or by other convenient means.

As shown in FIGURE 4, it is preferable that the roof member 53 be directly hinged by hinge 60 to the floor panel 45 of the structure. Hinge 60 will of course include hinge halves 61 and 62, the former being secured by attachments 63 to roof member 53, and the latter being secured by attachments 54 to the floor panel 45. Of course, it will be understood that rather than being hinged to the floor panel 45 proper, the roof member 53 may be hinged directly to support frame S. In either event, however, it is desired that a long piano hinge extending to and between both sides of the roof member 53 be employed. It will be noted that the hinging of the roof member 53 to the support panel structure in floor assembly is at a horizontal axis H which is transverse to the towing vehicle. In being so constituted there is no danger of the roof member "blowing off" or otherwise being altered in disposition since it is hinged at the front of its contact with the floor panel and since, further, the aerodynamics of the roof member structure are such that when the automobile is traveling wind forces will tend to push downwardly upon the roof member and the associated structure.

To elevate the cabin structure C it is seen that there may be provided an extensible boom 62 which itself is comprised of a tubular member 63 and an extensible member 64. A winch 65 is bracketed at 66 to member 63, whereas the tip 67 of the extensible member 64 is supplied with a guide 68 (a keyway, eyelet, pulley, or other means) which admits the passage therethrough of elongate connector 69 which connects directly to eye 70 of the roof member 53. The remaining extremity of elongate connector 68 is wound about winch 65, and the latter is cranked by conventional crank handle 71.

For convenience there may be supplied a stub connection 72 for disposition within (or receiving) the stub connection 73 of support frame S. When the cabin is collapsed so that the roof member 53 rests upon the floor panel 45, then the pin 74 may release the connection between stub connections 72 and 73 so that stub connection 72 may be withdrawn therefrom and the boom construction collapsed so that the latter may be stored either within enclosure 54 or in the automobile trunk.

The structure operates as follows. As is shown in FIGURE 1, the towing automobile 10, let it be assumed, has just stopped at a selected camping area. The occupants leave the automobile and set four jacks around the automobile in the manner shown in FIGURE 1. It will, of course, be necessary for the upstanding members 39 to be positioned (as shown in FIGURE 1) at the rear of the structure to accommodate the rear jack means 34. Once the four (two rear and two front) jacks are set, then turn buckles 28 are loosened, elongate connectors 27 are removed, and the upstanding means 16 comprising numbers 17, 18, and 15 may be disassembled by removal of pins 21, 22 and 22'. Thus, when the upstanding means 16 disposed on both sides of the rear of the vehicle are removed and stored in the automobile trunk, for example, then the front bumper mounting members 15 may also be removed by the removal of the respective pins 22 so that the automobile is released altogether from the cabin and supporting structure. Thereupon, the automobile may drive outwardly (i.e. back out) through the rear of the structure and through the rear jack means 34 to be used for other purposes.

When it is desired that the structure again be mounted to the towing automobile and the automobile driven to another outdoor location (or to return home) then the car is simply driven underneath the structure through the rear entrance formed by rear jack means 34; subsequently, the rear upstanding means 16 will be assembled by the several pins 21, 22 and 22' accommodating the connection of the coupling sleeves 17 with bumper mounting members 15 (engaging rear bumper 12 as shown in FIGURE 3) and upstanding members 16. Correspondingly, and before the front jacks are removed, the front support structure will be secured to the automobile in the manner indicated in FIGURE 3 with the assembly of the forward upstanding means comprising members 15, 17, and 31 by their respective pins 21 and 22. When all of this is accomplished then the jacks may be removed and the side-rear, inverted, L-configured, upstanding support members or side uprights 39 may be removed from their respective, telescoping socket S' of floor frame S (by removal of pins 39') and be stored either in the cabin enclosure or in the trunk of the automobile. Thereupon, and the weight of the support frame and cabin structure being upon the vehicle, the vehicle may immediately drive off to another designated area. It will be noted that during transit there need be no part of the support frame or associated structure protrude beyond the fender lines of the automobile in violation of safety regulations. Rather, the structure may be such as to be clearly within the fender lines so that there are no hazards on the highway. When, however, the automobile comes to new camping place at which the occupants desire to stop, then the jack structure may be set up and the rear upstanding support means 16 removed thereafter so that the car may be backed up rearwardly of the support frame S.

It will be appreciated that the support frame structure may be conveniently disattached from an automobile and stowed in a garage with a minimum of effort in disattaching the same from the automobile, the automobile being parked underneath the support frame and without interference therewith.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. For mounting to and support by an automobile, in combination, a support frame having a rearwardly extending stub connection, a floor secured to and above said support frame, collapsible wall panels secured at their lower margins to said floor, a rigid roof member, said wall panels being secured at their upper margins to said roof member, means hinging said roof member at a forward extremity thereof to said floor for pivotal movement about a horizontal axis transverse to said automobile, said roof member being supported by said frame and encasing said collapsible wall panels when disposed in a horizontal position, and means releasably secured to said support frame rearwardly thereof and also to said roof member at a rear portion thereof for hoisting said roof member, pivoting the latter about said horizontal axis, to provide an open enclosure between said wall panels, floor and roof, said hoisting means comprising an extensible boom, stub connection means affixed to said boom for releasably securing said extensible boom to said rearwardly extending stub connection of said support frame in an upright position, a winch fixedly disposed at a lower extremity of said boom, an elongate connector guide disposed at the tip of said boom, and elongate connector means wound about said winch, passing through said guide, and releasably secured to said roof member at the rearward margin thereof.

2. In combination an automobile having front and rear bumpers, a support frame horizontally disposed above said automobile and including respective rear, rearwardly extending, and respective front, upright-means engagement means and laterally, outwardly extending, side-uprights' engagement means proximate said rear engagement means, respectively, plural front and plural rear upright means releasably secured to and between said support frame, at said front and rear engagement means thereof, respectively, and said front and rear bumpers, respectively, of said automobile, said front and rear upright means being disposed between the fender lines of said automobile, plural rear jack means, respective side uprights releasably secured to said support frame at respective ones of said outwardly extending engagement means thereof and at mutually opposite, rear areas of said support frame and disposed outside of said fender lines, said plural rear jack means respectively engaging said side uprights for supporting the same and, thereby, said support frame when said rear upright means are removed from said support frame and said rear bumper, and front jack means selectively and releasably engaging said front upright means for supporting said front upright means and, thereby, said support frame when said front upright means are detached from said front bumper of said automobile.

3. Structure according to claim 2 wherein said plural, front and rear upright means are C-configured, each having an upstanding member releasably secured to said support frame, a lower bumper mounting member releasably secured to said bumper means, and a medially disposed sleeve pinned to said upstanding member and said bumper mounting member, interconnecting said upstanding member and said bumper mounting member.

4. Structure including, in combination, an automobile having a rear bumper, a support frame horizontally disposed above said automobile, plural, mutually spaced, rear upright means releasably secured to said bumper, disposed within the width of said automobile, and having respective means releasably attached to said support frame at mutually spaced points for supporting said support frame from and above said bumper, means secured to said support frame and disposed between said support frame and said automobile, forwardly of said rear upright means, for supporting said support frame above said automobile at a region forwardly of said rear upright means, plural side uprights disposed on opposite sides of said automobile for supporting said support frame above the height of said automobile and having means releasably securing said side uprights to said support frame at rear areas thereof, plural jack means respectively engaging said side uprights for supporting said side uprights and, thereby, said support frame when said rear upright means are removed from said support frame and said rear bumper, and plural additional jack means engaging said support frame forwardly of said side uprights for further supporting said support frame forwardly of said side uprights.

5. Structure according to claim 4 wherein said support frame includes side telescopic sockets, and wherein said side uprights are of inverted-L configuration and the extremities of which are inwardly directed toward and telescopingly received by and releasably secured within said telescopic sockets.

6. Structure according to claim 4 wherein said side uprights are individually provided with jack bar guide means for slideably receiving said jack means, said jack means including jack bars and respective jack mechanisms cooperably disposed upon said jack bars and engaging said guide means for lifting the latter.

References Cited in the file of this patent

UNITED STATES PATENTS

| | | |
|---|---|---|
| 1,962,388 | Crane | June 12, 1934 |
| 2,245,465 | Cole | June 10, 1941 |
| 2,291,900 | Jimmes | Aug. 4, 1942 |
| 2,710,977 | Fannin | June 21, 1955 |
| 2,817,852 | Neilson | Dec. 31, 1957 |
| 2,907,077 | Pugsley | Oct. 6, 1959 |
| 2,976,078 | Maidl | Mar. 21, 1961 |
| 2,995,397 | Eames | Aug. 8, 1961 |

FOREIGN PATENTS

| | | |
|---|---|---|
| 220,036 | Australia | May 16, 1957 |